(12) United States Patent
Ewart et al.

(10) Patent No.: US 9,777,083 B2
(45) Date of Patent: Oct. 3, 2017

(54) PROCESS FOR MAKING ETHYLENE-BASED POLYMERS USING HYDROCARBON INITIATORS

(71) Applicant: Dow Global Technologies LLC, Midland, MI (US)

(72) Inventors: Sean W. Ewart, Pearland, TX (US); Teresa P. Karjala, Lake Jackson, TX (US); Mehmet Demirors, Pearland, TX (US); Christopher R. Eddy, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/308,988

(22) PCT Filed: May 8, 2015

(86) PCT No.: PCT/US2015/029867
§ 371 (c)(1),
(2) Date: Nov. 4, 2016

(87) PCT Pub. No.: WO2015/172009
PCT Pub. Date: Nov. 12, 2015

(65) Prior Publication Data
US 2017/0073439 A1    Mar. 16, 2017

Related U.S. Application Data

(60) Provisional application No. 61/990,847, filed on May 9, 2014, provisional application No. 62/033,729, filed on Aug. 6, 2014.

(51) Int. Cl.
| | | |
|---|---|---|
| *C08F 110/02* | (2006.01) | |
| *C08F 10/02* | (2006.01) | |
| *C08F 4/00* | (2006.01) | |

(52) U.S. Cl.
CPC .......... *C08F 110/02* (2013.01); *C08F 10/02* (2013.01)

(58) Field of Classification Search
CPC ......... C08F 110/02; C08F 210/02; C08F 4/00
USPC ................................................ 526/89, 352.2
See application file for complete search history.

(56) References Cited

U.S. PATENT DOCUMENTS 5,268,440 A * 12/1993 Luft .................. C08F 10/02
526/352.2
6,967,229 B2   11/2005 Voorheis

FOREIGN PATENT DOCUMENTS

| EP | 1944327 A1 | 7/2008 | |
|---|---|---|---|
| WO | 2012/177299 A1 | 12/2012 | |
| WO | WO 2012/177299 A1 * | 12/2012 | ............ C08F 110/02 |

* cited by examiner

*Primary Examiner* — Fred M Teskin
(74) *Attorney, Agent, or Firm* — Husch Blackwell LLP (57) ABSTRACT

An ethylene-based polymer, e.g., LDPE, with a low dissipation factor is made by a process comprising the step of contacting at polymerization conditions ethylene and, optionally, one or more comonomers, e.g., an alpha-olefin, with at least one carbon-carbon (C—C) hydrocarbyl, free-radical initiator of Structure 1: wherein $R_1$, $R_2$, $R_3$, $R_4$, $R_5$ and $R_6$, are each, independently, hydrogen or a hydrocarbyl group and wherein, optionally, two or more R groups ($R_1$, $R_2$, $R_3$, $R_4$, $R_5$ and $R_6$) form a ring structure, with the provisos that at least one of $R_2$ and $R_5$, and at least one of $R_3$ and $R_6$ is a hydrocarbyl group of at least two carbon atoms, e.g., an alkaryl of at least seven carbon atoms.

14 Claims, 1 Drawing Sheet

PROCESS FOR MAKING ETHYLENE-BASED POLYMERS USING HYDROCARBON INITIATORS

FIELD OF THE INVENTION

This invention relates to ethylene-based polymers. In one aspect the invention relates to a process of making ethylene-based polymers using a hydrocarbon initiator while in another aspect, the invention relates to ethylene-based polymers with a very low dissipation factor.

BACKGROUND OF THE INVENTION

Polyethylene is used in the electrical and telecommunications business as an insulator for electrical wire and cable due to its very low electrical conductivity. For example, foamed low density polyethylene (LDPE), alone or blended with another polymer, is routinely used to insulate communication cable, such as coaxial cable and/or radio frequency cable. Polyethylene is especially suitable for high voltage cables due to its low dissipation factor at high voltage and its excellent mechanical properties.

Rapid advancements in the telecommunication industry are placing greater demand for higher signal quality in communication cable. One way to obtain higher signal quality in communication cable is to lower signal attenuation. Low levels (e.g., 1-10 moles parts per million (ppm)) of polar impurities in the polyethylene increases the electrical conductivity thus making it less suitable for high voltage, e.g., about 65 kV, electrical applications. These polar impurities typically originate from polar chain transfer agents that are used to control the polymer molecular weight and/or are the decomposition products of the peroxides that are used to initiate the polymerization.

LDPE is typically produced by polymerizing ethylene in a high pressure reactor using a peroxide initiator. Different peroxide initiators operate at different reactor temperatures depending on their half-life decomposition temperature. Initiators with lower half-life decomposition temperatures are used for lower reactor temperatures which can be advantageous to make higher density LDPE. Decomposition of peroxides is a highly exothermic event which makes the storage and transport of these peroxides very difficult, most notably for initiators with low half-life decomposition temperatures.

Thus, the art recognizes the need for polyethylene with low amounts of impurities, polar groups and unsaturation in order to achieve lower signal attenuation and lower dissipation factors in cable insulation. The art further recognizes the need for a LDPE electrical insulation material with a low dissipation factor that does not compromise the physical properties and/or processability properties of the LDPE. The art also recognizes the need for a class of initiators that decompose at the same temperature as commercial peroxides but decompose either endothermically or with much less heat release than standard peroxides. The lower amount of heat evolved from such a decomposition makes the initiator much more inherently stable and increases the self-accelerating decomposition temperature as compared to standard peroxides.

SUMMARY OF THE INVENTION

In one aspect the invention is a process for making an ethylene-based polymer, the process comprising the step of contacting at polymerization conditions ethylene and, optionally, one or more alpha-olefin comonomers, with at least one carbon-carbon (C—C), hydrocarbyl, free-radical initiator of Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that (i) at least one of $R_2$ and $R_5$, and at least one of $R_3$ and $R_6$ is a hydrocarbyl group of at least two carbon atoms, and (ii) the polymerization conditions include a polymerization temperature of 210° C.-300° C.

In one aspect the invention is a process for making an ethylene-based polymer, the process comprising the step of contacting ethylene and, optionally, one or more comonomers, with at least one carbon-carbon (C—C) hydrocarbyl, free-radical initiator with a DSC decomposition temperature less than, or equal to, 145° C. and of Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is an alkaryl group of at least seven carbon atoms.

In one aspect the invention is an ethylene-based polymer made by a process of this invention.

In one aspect the invention is an ethylene-based polymer having a dissipation factor of no greater than $1.49 \times 10^{-4}$ radian at 2.47 GHz, or no greater than $8 \times 10^{-5}$ radians at 2.0 GHz.

In one aspect the invention is an ethylene-based polymer having at least one of the following properties: (1) a carbonyl ratio of less than (<) 0.02, or 0.01, and (2) a dissipation factor less than or equal to ($\leq$) $1.55 \times 10^{-4}$ radian at 2.47 GHz, or $1.50 \times 10^{-4}$ radian at 2.47 GHz, or $1.49 \times 10^{-4}$ radian at 2.47 GHz.

In one aspect the invention is an ethylene-based polymer with both of the following properties: (1) a carbonyl ratio of less than (<) 0.02, or 0.01, and (2) a dissipation factor less than or equal to ($\leq$) $1.55 \times 10^{-4}$ radian at 2.47 GHz, or $1.50 \times 10^{-4}$ radian at 2.47 GHz, or $1.49 \times 10^{-4}$ radian at 2.47 GHz.

In one aspect the invention is a carbon-carbon (C—C), hydrocarbyl, free-radical initiator with a half-life decomposition temperature less than, or equal to, 145° C. and of Structure I:

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is an alkaryl group of at least seven carbon atoms.

DETAILED DESCRIPTION OF THE PREFERRED EMBODIMENT

In one aspect the invention is a process for making an ethylene-based polymer, the process comprising the step of contacting at polymerization conditions ethylene and, optionally, one or more alpha-olefin comonomers, with at least one carbon-carbon (C—C), hydrocarbyl, free-radical initiator of Structure I:

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that (i) at least one of $R_2$ and $R_5$, and at least one of $R_3$ and $R_6$ is a hydrocarbyl group of at least two carbon atoms, and (ii) the polymerization conditions include a polymerization temperature of 210° C.-300° C.

In one aspect the invention is a process for making an ethylene-based polymer, the process comprising the step of contacting ethylene and, optionally, one or more comonomers, with at least one carbon-carbon (C—C) hydrocarbyl, free-radical initiator with a DSC decomposition temperature less than, or equal to, 145° C. and of Structure I:

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is an alkaryl group of at least seven carbon atoms.

In one embodiment, an inventive process may comprise a combination of two or more aspects of the invention as described herein.

In one embodiment, the C—C free-radical initiator used in any aspect of the inventive process as described herein is present in an amount greater than, or equal to, 0.001 grams per kilogram (g/kg), further greater than 0.005 grams per kilogram, further greater than 0.008 grams per kilogram, further greater than 0.01 grams per kilogram, of the ethylene fed to the polymerization reaction.

In one embodiment, the C—C free-radical initiator used in any aspect of the inventive process as described herein has a decomposition temperature of greater than or equal to ($\geq$)125° C., or $\geq$130° C., or $\geq$150° C., or >180° C., or $\geq$200° C., or $\geq$250° C., based on DSC measurements.

In one embodiment, any aspect of the inventive process as described herein comprises contacting ethylene and, optionally, one or more alpha-olefin comonomers, with at least two C—C free-radical initiators.

In one embodiment, for Structure I of any aspect of this invention, $R_1$ and $R_4$ are phenyl.

In one embodiment, for Structure I of any aspect of this invention, the at least one C—C initiator is selected from the group consisting of 3,4-diethyl-3,4-diphenyl hexane and 3,4-dipropyl-3,4-diphenyl hexane.

In one embodiment the invention is an ethylene-based polymer formed by the inventive process of any one of the previous embodiments.

In one embodiment the ethylene-based polymer of any of the previous embodiments is a low density polyethylene (LDPE).

In one embodiment the ethylene-based polymer of any of the previous embodiments is a high pressure low density polyethylene (HP-LDPE).

In one embodiment the ethylene-based polymer of any of the previous embodiments has a dissipation factor of no greater than $1.49 \times 10^{-4}$ radian at 2.47 GHz, preferably no greater than $1.45 \times 10^{-4}$ radian at 2.47 GHz and more preferably no greater than $1.43 \times 10^{-4}$ radian at 2.47 GHz, or alternatively, no greater than $8 \times 10^{-5}$ radian at 2.0 GHz, preferably no greater than $7.5 \times 10^{-5}$ radian at 2.0 GHz and more preferably no greater than $7 \times 10^{-5}$ radian at 2.0 GHz In one embodiment, the melt index ($I_2$, 190° C./2.16 kg) of the ethylene-based polymer of any of the previous embodiments is from 0.1-100 g/10 min, or from 0.5-50 g/10 min, or from 1-20 g/10 min.

In one embodiment, the ethylene-based polymer of any of the previous embodiments has a density from 0.90 to 0.95 g/cc, preferably from 0.91 to 0.935 g/cc, more preferably from 0.914 to 0.930 g/ee.

In one embodiment, the ethylene-based polymer of any of the previous embodiments has a molecular weight distribution from the conventional calibration of triple detector GPC (Mw/Mn, Conv.) from 3 to 20, or from 4 to 15, or from 5 to 10.

In one embodiment the ethylene-based polymer of any of the previous embodiments comprises $\geq$0.1 amyl branches per 1000 carbon atoms, or $\geq$0.5 amyl branches per 1000 carbon atoms, or >1 amyl branches per 1000 carbon atoms as determined by 13C NMR.

In one embodiment the ethylene-based polymer of any of the previous embodiments comprises less than (<) 100 weight ppm oxygen, preferably <50 weight ppm oxygen and more preferably <1 weight ppm oxygen as determined by mass balance of oxygenated components added to the polymerization process.

In one embodiment, the invention is a composition comprising the ethylene-based polymer made by any process of this invention.

In one embodiment, the invention is a composition comprising (i) an ethylene-based polymer made by any process of this invention, and (ii) one or more additives.

An inventive composition may comprise a combination of two or more embodiments as described herein.

In one embodiment the invention is a composition comprising the ethylene-based polymer of this invention.

In one embodiment the composition comprising the ethylene-based polymer of this invention also comprises one or more olefin-based polymers.

The invention also provides an article comprising at least one component formed from an inventive composition as described herein. In a further embodiment, the article is a film or a coating.

An inventive article may comprise a combination of two or more embodiments as described herein.

In one aspect the invention is a process for making an acrylate-, methacrylate-, or vinyl acetate-based polymer, the process comprising the step of contacting at least one of an acrylate, methacrylate or vinyl acetate and, optionally, one or more comonomers, with at least one carbon-carbon (C—C), hydrocarbyl, free-radical initiator of Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is a hydrocarbyl group of at least two carbon atoms.

In one embodiment of the process for making an acrylate-, methacrylate- or vinyl acetate-based polymer, the comonomer is present and it is an olefin.

In one embodiment of the process for making an acrylate-, methacrylate- or vinyl acetated-based polymer, the comonomer is ethylene.

In one embodiment of the process for making an acrylate-, methacrylate- or vinyl acetate-based polymer, the C—C free radical initiator has a half-life decomposition temperature less than, or equal to, 145° C., or 140° C., or 135° C.

In one embodiment of the process for making an acrylate-, methacrylate- or vinyl acetate-based polymer, the process comprises contacting at least one of an acrylate, methacrylate and vinyl acetate and, optionally, one or more alpha-olefin comonomers, with at least two C—C free-radical initiators.

In one embodiment of the process for making an acrylate-, methacrylate- or vinyl acetate-based polymer, $R_1$ and $R_4$ of Structure I are phenyl.

In one embodiment of the process for making an acrylate-, methacrylate- or vinyl acetate-based polymer, Structure I is 3,4-dibenzyl-3,4-ditolyl hexane (Structure VI).

In one embodiment of the process for making an acrylate-, methacrylate- or vinyl acetate-based polymer, Structure I is 3,4-dibenzyl-3,4-diphenyl hexane (Structure VIII).

In one embodiment the acrylate or vinyl acetate is 2-methylhexyl acrylate or vinyl dodecanoate, respectively.

In one embodiment the acrylate-, methacrylate- or vinyl acetate-based polymer is formed by the process of any one of the previous embodiments.

In one embodiment, the invention is a composition comprising the acrylate-, methacrylate- or vinyl acetate-based polymer made by the process of any one of the previous embodiments.

In one embodiment, the invention is a homopolymer or copolymer of 2-methylhexyl acrylate or vinyl dodecanoate.

In one embodiment, the invention is a composition comprising (i) an acrylate-, methacrylate- or vinyl acetate-based polymer made by the process of any one of the previous embodiments, and (ii) one or more additives.

An inventive composition may comprise a combination of two or more embodiments as described herein.

In one embodiment the invention is a composition comprising the acrylate-, methacrylate- or vinyl acetate-based polymer of this invention.

In one embodiment the composition comprising the acrylate-, methacrylate- or vinyl acetate-based polymer of this invention also comprises one or more olefin-based polymers.

The invention also provides an article comprising at least one component formed from an inventive composition as described herein. In a further embodiment, the article is a film or a coating.

In one aspect the invention is a carbon-carbon (C—C), hydrocarbyl, free-radical initiator with a half-life decomposition temperature less than, or equal to, 145° C. and of Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is an alkaryl group of at least seven carbon atoms.

C—C Initiators

The carbon-carbon ("C—C") initiators used in the practice of this invention comprise only carbon and hydrogen, and have Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that at least one of $R_2$ and $R_5$, and at least one of $R_3$ and $R_6$ is a hydrocarbyl group of at least two carbon atoms.

In one embodiment, one or more of the $R_1$-$R_6$ groups are aliphatic.

In one embodiment, one or more of the $R_1$-$R_6$ groups are alkyl.

In one embodiment, one or more of the $R_1$-$R_6$ groups are aryl.

In one embodiment, two or more of the $R_1$-$R_6$ groups are aryl.

In one embodiment, $R_1$ and $R_4$ are aryl, preferably phenyl.

In one embodiment, $R_1$ and $R_4$ are aryl, and one of $R_2$ and $R_5$, and one of $R_3$ and $R_6$ is hydrogen.

In one embodiment, $R_1$ and $R_4$ are aryl, and one of $R_2$ and $R_5$ and one of $R_3$ and $R_6$ is a $C_2$-$C_{10}$ alkyl and the other of $R_2$ and $R_5$ and the other of $R_3$ and $R_6$ is hydrogen.

In one embodiment $R_1$ and $R_4$ are the same or different aryl radicals. In a further embodiment, $R_1$ and $R_4$ are each phenyl, e.g., Structure II; and wherein $R_2$, $R_3$, $R_5$ and $R_6$ are each as described above:

(Structure II)

In one embodiment, $R_2$-$R_3$ and $R_5$-$R_6$ are the same or different alkyl radicals, more preferably the same or different $C_{1-6}$ alkyl radicals, and even more preferably the same $C_{1-4}$ straight chain alkyl radical.

Representative C—C initiators include, but are not limited to, the following Structures as follows: 3,4-dimethyl-3,4-diphenyl hexane (Structure III)

(Structure III)

and, 3,4-diethyl-3,4-diphenyl hexane (Structure IV)

(Structure IV)

2,7-dimethyl-4,5-diethyl-4,5-diphenyl octane (DBuDPH) (Structure V)

(Structure V)

3,4-dibenzyl-3,4-ditolyl hexane (DBnDTH) (Structure VI)

Structure VI 3,4-diethyl-3,4-di(dimethylphenyl) hexane (Structure VII)

Structure VII and, 3,4-dibenzyl-3,4-diphenyl hexane (Structure VIII)

Structure VIII

In one embodiment the decomposition temperature of the C—C initiator is less than or equal to ($\leq$) 145° C., or $\leq$140° C., or $\leq$135° C., based on DSC measurements.

Other C—C initiators include those of Structure 1 and described in such publications as WO 2012/096962, WO 2012/074812, US 2010/0108357, EP 1 944 327, U.S. Pat. Nos. 5,268,440, 6,967,229 and US 2006/0047049. The C—C initiators can be used alone or in combination with one another.

In one embodiment, the C—C free-radical initiator is present in an amount greater than, or equal to, 0.001 grams per kilogram (g/kg), further greater than 0.005 g/kg, further greater than 0.008 g/kg, further greater than 0.01 g/kg, of the ethylene fed to the polymerization reaction. While the only limitation on the maximum amount of C—C initiator used in the practice of this invention is a function of process economics and efficiency, typically the maximum amount of C—C initiator used in the practice of this invention does not exceed 1 g/kg, more typically does not exceed 0.1 g/kg and even more typically does not exceed 0.05 g/kg, of the ethylene fed to the polymerization reaction.

A C—C initiator may comprise a combination of two or more embodiments as described herein. In those embodiments in which the C—C initiator is used in combination with one or more other C—C initiators, only one of the C—C initiators must have at least one of $R_2$ and $R_5$, and at least one of $R_3$ and $R_6$ as a hydrocarbyl group of at least two carbon atoms. In such embodiments, a C—C initiator of Structure I comprises at least 25 wt %, preferably at least 50 wt %, more preferably more than 50 wt % and even more preferably at least 75 wt %, of the total amount of C—C initiator used in the process.

In one embodiment the C—C initiators of this invention are characterized not only by their low decomposition temperatures but also by their low heat release upon decomposition that in some instances is actually absorbed making the decomposition endothermic as opposed to exothermic. These low decomposition temperatures and low heat release characteristics allow for more stable storage of polymerizable compositions containing these initiators, without the need for refrigeration, than either most peroxide initiators and C—C initiators with relatively high decomposition temperatures.

Figure 1:
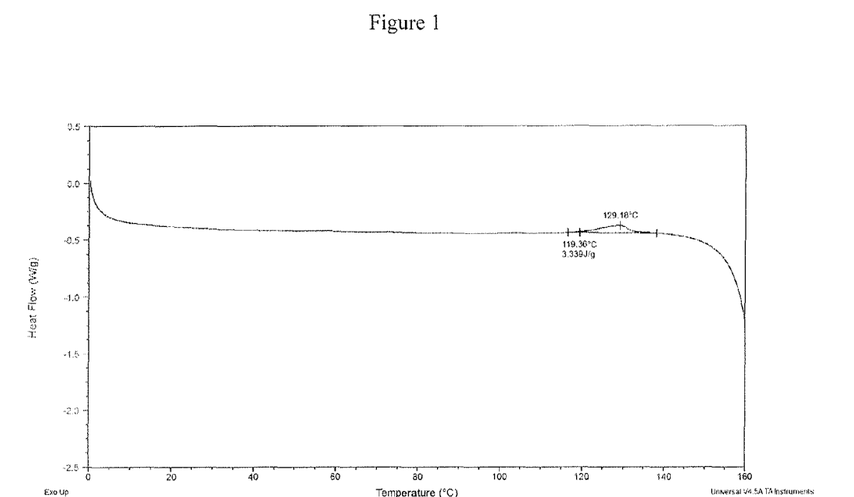
FIG. 1 reports the DSC spectrum for 3,4-dibenzyl-3,4-ditolylhexane.
Figure 2:
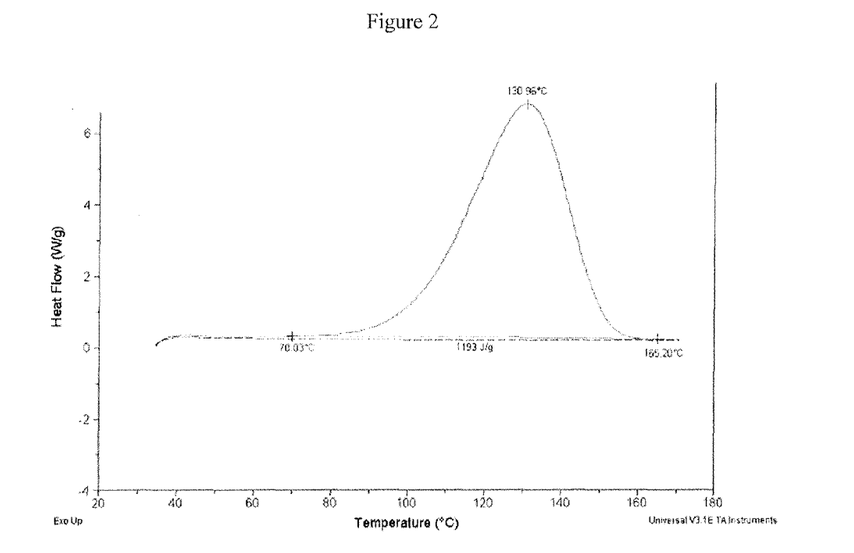
FIG. 2 reports the DSC spectrum for tert-butyl peroxy-2-ethylhexanoate.

FIG. 1 reports the DSC spectrum for 3,4-dibenzyl-3,4-ditolylhexane which is representative of a C—C initiator with both a low decomposition temperature (129° C.) but also a low heat release upon decomposition (3.34 J/g). The decomposition temperature is the peak temperature of the exotherm (as shown in FIG. 1), and it and the heat produced (in Joules per gram, J/g) are marked on the spectrum. In contrast, tert-butyl peroxy-2-ethylhexanoate is a typical commercial peroxide initiator that also has a low decomposition temperature (131° C.) but a relatively high heat (1193 J/g) release (see the DSC spectrum in FIG. 2).

In one embodiment the invention is C—C initiators of Structure I with a half-life decomposition temperature less than, or equal to, 145° C., or 140° C., or 135° C., and in which at least one of $R_2$ and $R_5$, and at least one of $R_3$ and $R_6$ is an alkaryl group of at least seven carbon atoms.

In one embodiment the invention is the C—C initiator of Structure VI or VIII.

Process

The invention provides a process. In one embodiment, the invention provides a process for producing a low density polyethylene, the process including contacting, in a polymerization reactor under high pressure polymerization conditions, ethylene with a C—C free radical initiator in the presence of a solvent to form a reactor effluent. The reactor effluent contains a low density polyethylene (LDPE) and unreacted species. The process includes separating the unreacted species from the LDPE to form a recycle stream. The process includes forming a LDPE having a dissipation factor less than or equal to $1.49 \times 10^{-4}$ radian at 2.47 GHz.

As used herein, "reaction conditions" for the manufacture of an ethylene-based polymer are temperature, pressure, reactant concentrations, solvent selection, chain transfer agent (CTA), reactant mixing/addition parameters, and other conditions within a polymerization reactor that promote reaction between the reagents and formation of the resultant product, namely LDPE. The term "high pressure polymerization conditions," as used herein, are reaction conditions that include 15,000 to 50,000 pounds per square inch gauge (psig) (1021-3403 atmosphere (atm)) of pressure and a reaction temperature from 150° C. to 350° C. to promote free radical polymerization of the ethylene.

High pressure polymerization of ethylene is typically conducted in a tubular reactor, in a stirred autoclave, or a combination of a tubular reactor and a stirred autoclave. Nonlimiting examples of suitable high pressure polymerization reactors include a single autoclave or multiple autoclaves, a combination of one or more autoclaves and a tubular reactor operating in series or in sequential order, or a single tubular reactor. The reactor series order may consist of an autoclave reactor followed by a tubular reactor. Furthermore, the autoclave reactor may have one or more reactor zones. Each of the reactor zones may have independent feed of ethylene, optional comonomers, free radical initiators, catalyst, and chain transfer agents (CTA). In addition, the tubular reactor may have one or more feed points along the length of the tubular reactor to allow independent feed of ethylene, optional comonomers, free radical initiators, catalysts, and CTA.

The present process may be performed using a continuous process or a batch process. The ethylene monomer (and optional comonomer(s)) may be fed into the polymerization reactor entirely in the beginning or at the front or may be parsed and fed into the reactor at several different locations (for a continuous-type process) during the reaction cycle.

When a stirred autoclave reactor is employed, the pressure can be in the range from 1,000 to 4,000 bar absolute ("bara") (100 to 400 megapascals absolute ("MPaa")), or from 2,000 to 3,000 bara (200 to 300 MPaa), and the temperature can be in the range from 210° C. to 300° C., preferably from 210° C. to 290° C., preferably from 210° C. to 280° C., preferably from 260° C. to 280° C.

When a tubular reactor is employed, the pressure can be in the range from 1,000 to 4,000 bara (100 to 400 MPaa) and the temperature can be in the range from 210° C. to 350° C. or to 320° C., preferably from 230° C. to 330° C., preferably from 230° C. to 320° C. Polymerization in a tubular reactor under high pressure polymerization conditions occurs in turbulent process fluid flow. At certain points along the tube, a portion of the heat produced during the free-radical polymerization may be removed through the tube wall.

In an embodiment, the reaction temperature for at least a portion of the polymerization is from 200° C., or 225° C., or 250° C., or 260° C. to 360° C., or 340° C., or 320° C., or 300° C., or 280° C. In a further embodiment, the reaction temperature is held for at least 25% of the polymerization, or at least 50% of the polymerization, at least 75% of the polymerization, or during the entire polymerization process.

In an embodiment, the present process is performed in a multi-reactor system including a first reactor that is an autoclave reactor and a second reactor that is a tubular reactor. The first (autoclave) reactor has one, two, or more reaction zones. The temperature in each reactor zone is the same or different and is from 180° C., or 200° C., or 230° C., or 240° C. to 245° C., or to 250° C., or 280° C., or 360° C. The pressure in each reactor zone of the first reactor is the same or different and is from 22,000 psig, or 24,000 psig to 27,000 psig, or 33,000 psig.

The second reactor of the multi-reactor system is a tubular reactor. The second (tubular) reactor has one, two, or more reactor zones. The temperature in each tubular reactor zone is the same or different and is from 180° C., or 200° C., or 230° C., or 240° C. to 245° C., or to 250° C., or 280° C., or 360° C. The pressure in each tubular reactor zone is the same or different and is from 22,000 psig, or 24,000 psig to 27,000 psig, or 33,000 psig.

In an embodiment, the contacting step is performed in the presence of a chain transfer agent (CTA) that is a saturated hydrocarbon. After hydrogen atom donation, the CTA may form a radical which can react with a monomer, an oligomer, or a comonomer, and start a new polymer chain. The result is that the original CTA is incorporated into a new or existing polymer chain, thereby introducing a new functionality into the polymer chain associated with the original CTA. The CTA may introduce new functionality into the polymer chain that is not normally the result of the monomer/comonomer polymerization.

In an embodiment, two or more chain transfer agents may be used. At least one of the chain transfer agents may be an alpha-olefin. Other optional components that may be fed to the polymerization reactor to initiate and support the free-radical reaction include reaction initiators and catalysts.

In an embodiment, a single CTA is used. The single CTA is a saturated hydrocarbon. The CTA is isobutane. The CTA is present during the polymerization in an amount from 0.05 weight percent (wt) %, or 0.1 wt % to 0.2 wt %, or 0.5 wt %, with wt % based on the combined weight of the CTA, the ethylene monomer and any optional comonomer (if present).

The solvent is a liquid (at ambient conditions). The solvent serves as a free radical initiator solvent, a balance for pump flow, and combinations thereof. In an embodiment, the solvent is a nonpolar isoparaffin fluid solvent. A nonlimiting example of a suitable isoparaffin fluid solvent is ISOPAR™ H. The present process uses nonpolar isoparaffin fluid solvent as a replacement for conventional flow balance polar alkanols such as isopropanol, butanol, t-butanol, and any combination thereof.

The process includes high pressure free radical polymerization of ethylene which forms a reactor effluent. The reactor effluent includes a low density polyethylene (LDPE) and unreacted species. The unreacted species include one, some, or all of the following: solvent, unreacted monomer (ethylene), unreacted optional comonomer, unreacted free radical initiator, unreacted CTA, unreacted catalyst (optional), free radical initiator decomposition products, impurities from feed systems, lubricants used in machinery, and any combination thereof. The unreacted species typically include ethylene in a majority amount (greater than 95 wt %, or greater than 97 wt % of the total weight unreacted species) with the other components present in a combined amount from less than 5 wt % or less than 3 wt % (based on total weight unreacted species).

The process includes separating the unreacted species from the LDPE to form a recycle stream. The term "recycle stream" as used herein, is the excess unreacted species retrieved during the primary separation phase. The unreacted species are retrieved during a primary separation phase which reduces the pressure of the first polymerization reactor (high pressure recycle stream) to about 3000 psig and subsequently reduces the pressure to about ambient pressure (low pressure recycle stream) in a subsequent vessel or separator. The separated gases are collected to form the recycle stream. A portion of the recycle stream is introduced into the polymerization reactor to improve the monomer efficiency of production units.

In one embodiment the process is conducted in the presence of one or more peroxides. In one embodiment the molar ratio of peroxide(s) to the carbon-carbon, hydrocarbyl free radical initiator is less than, or equal to, 1:1, or 2:1, or 3:1, or 4:1 or 5:1. In one embodiment the molar ratio of peroxide(s) to the carbon-carbon, hydrocarbyl free radical initiator is greater than, or equal to, 100:1, or 50:1, or 20:1, or 10:1.

In one embodiment the process is conducted in the absence of, or free of, peroxide and other forms of oxygen. "Absence of" or "free of" means that practical measures are taken in the conduct of the process so as not to introduce peroxide or other forms of oxygen into the reaction through any of the reagents, equipment and conditions of the process with the understanding that some minimal amount of oxygen in the form of a contaminant may be present. Absence of or free of peroxide or other forms of oxygen means that the ethylene-based polymer made by the process comprises less than 50 parts per million (ppm) oxygen and has a dissipation factor of no greater than $1.49 \times 10^{-4}$ radian at 2.47 GHz.

Ethylene-Based Polymer and Composition

In an embodiment, a polymeric composition is provided and includes an ethylene-based polymer. In one embodiment, the ethylene-based polymer is LDPE. The ethylene-based polymer is produced by any of the foregoing processes. In one embodiment the ethylene-based polymer exhibits a carbonyl ratio of less than (<) 0.01 and a dissipation factor less than or equal to $1.49 \times 10^{-4}$ radian at 2.47 GHz.

The present polymeric composition may comprise two or more embodiments disclosed herein.

Coated Conductor

In an embodiment, a coated conductor is provided and includes a conductor and a coating on the conductor. The coating is made from a blend comprising (A) the ethylene-based polymer of this invention, and (B) high density polyethylene (HDPE) made by a process other than the process of this invention. The blend can be expanded to form a foam composition. The ethylene-based polymer may be any ethylene-based polymer made by the process of this invention. In one embodiment the ethylene-based polymer is LDPE. The ethylene-based polymer has a dissipation factor less than or equal to $1.49 \times 10^{-4}$ radian at 2.47 GHz.

"Conductor" as used herein means at least one metal wire and/or at least one metal cable. The conductor may be a single-wire or multi-wire and may be in strand form or tubular form. Nonlimiting examples of suitable conductors include silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor. The coating includes the present polymeric composition. The polymeric composition may be any polymeric composition as disclosed herein. In an embodiment, the present polymeric composition is an insulation layer on the conductor.

The coating is on the conductor. As used herein, "on" includes direct contact or indirect contact between the coating and the metal conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) and/or intervening material(s) is/are located between the conductor and the coating. The coating may wholly or partially cover or otherwise surround or encase the conductor. The coating may be the sole component surrounding the conductor. Alternatively, the coating may be one layer of a multilayer jacket or sheath encasing the conductor. The primary purpose of the intervening layer is to enhance the adhesion between the coating and the conductor.

The present coated conductor as described herein can be used to transmit a radio-frequency signal, either digital or analog signal. Nonlimiting examples of suitable applications include CATV cable for drop, distribution, and trunk; telephone cable; radio frequency cable for mobile telephones and two way radio; cellular telephone base stations, cable television networks, subscriber lines for telephone systems; and various other communication cables.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc., excepting those that are not essential to the performance, operability or the like of the composition, process, etc. The term "consisting of" excludes from a composition, process, etc., any component, step, etc., not specifically disclosed. The term "or", unless stated otherwise, refers to the disclosed members individually as well as in any combination.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "olefin-based polymer," as used herein, refers to a polymer that comprises a majority amount of polymerized olefin monomer, for example, ethylene or propylene, (based on weight of the polymer) and, optionally, may contain at least one comonomer.

The term "ethylene-based polymer," as used herein, refers to a polymer that comprises a majority amount of polymerized ethylene monomer (based on weight of the polymer) and, optionally, may contain at least one comonomer.

"Hydrocarbyl," and like terms, refer to a radical consisting of carbon and hydrogen atoms. Nonlimiting examples of hydrocarbyl radicals include alkyl (straight chain, branched or cyclic), aryl (e.g., phenyl, naphthyl, anthracenyl, biphenyl), aralkyl (e.g., benzyl), and the like.

"Aliphatic hydrocarbon" and like terms mean a branched or unbranched or cyclic, saturated or unsaturated, hydrocarbon radical. Nonlimiting examples of suitable aliphatic radicals include methyl, ethyl, n-propyl, i-propyl, 2-propenyl (or allyl), vinyl, n-butyl, t-butyl, i-butyl (or 2-methylpropyl), cyclopentyl, cyclohexyl, and the like. In one embodiment, the aliphatic radicals are alkyl radicals of 1 to 24 carbon atoms.

"Aryl" and like terms mean an aromatic radical which may be a single aromatic ring or multiple aromatic rings which are fused together, linked covalently, or linked to a common group such as a methylene or ethylene moiety. Nonlimiting examples of aromatic ring(s) include phenyl, naphthyl, anthracenyl, biphenyl, among others. In one embodiment, the aryl radicals typically comprise 6 to 20 carbon atoms.

"Aralkyl", "alkaryl" and like terms refer to a radical consisting of an alkyl group and an aryl group. Nonlimiting representative examples include benzyl and tolyl.

Test Methods

The carbonyl ratio is determined by Fourier Transform Infrared Spectroscopy (FTIR). Films of 10-20 mils thickness are pressed between two sheets of TEFLON™ polymer by heating on low (contact) pressure at 120-130° C. for 1 minute and high pressure (20,000 psi) for 1 minute. The samples are removed from the press and cooled to room temperature (23° C.). Collecting FTIR spectra are conducted using the following instrument and parameters:

Spectrometer: Nicolet 6700;
Software: OMNIC 8.1.11;
Mode: Transmission;
Source: IR;
Detector: DTGS KBr;
Number of sample scans: 64;
Resolution: 4 cm.

The relative level of carbonyl groups are found by the ratio of the absorbances at 1722 $cm^{-1}$ to absorbance at 2019 $cm^{-1}$ (internal polyethylene (PE) thickness).

Density is determined according to ASTM D 1928. Samples are pressed at 374° F. (190° C.) and 30,000 psi for three minutes, and then at 70° F. (21° C.) and 30,000 psi for one minute. Density measurements are made within one hour of sample pressing, using ASTM D792, Method B.

The dissipation factor is the lost energy of an applied electrical field due to internal motion of a material placed in the field. The dissipation factor is measured on 50 mil plaques at a frequency of 2.47 GHz using an Agilent 8753 ES S-parameter network analyzer with compatible split post dielectric resonator. The following parameters are used in compression molding of the plaques:

5 minutes at low pressure (500 psi) and 120° C.,
5 minutes at high pressure (2500 psi) and 120C., and
Water cooling to room temperature.

Melt Index, or $I_2$, is measured in accordance by ASTM D 1238, Condition 190° C./2.16 kg, Method B, and is reported in grams eluted per 10 minutes.

For the GPC techniques used herein (Conventional GPC, Light Scattering GPC, and gpcBR), a Triple Detector Gel Permeation Chromatography (3D-GPC or TDGPC) system is used. This system consist of a Waters (Milford, Mass) model 150C High Temperature Chromatograph (other suitable high temperatures GPC instruments include Polymer Laboratories (Shropshire, UK) Model 210 and Model 220 or PolymerChAR (Valencia, Spain) GPC-IR)), equipped with a Precision Detectors (Amherst, Mass.) 2-angle laser light scattering (LS) detector Model 2040, an IR4 or IR5 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Suitable high temperature GPC columns can be used, such as four 30 cm long Shodex HT803 13 micron columns, four 30 cm Polymer Labs columns of 20-micron mixed-pore-size packing (MixA LS, Polymer Labs), or four 30 cm Olexis-LS columns of 13-micron mixed-pore-size packing (Polymer Labs). Here, the Olexis-LS columns are used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing "200 ppm of 2,6-di-tert-butyl-4methylphenol (BHT)." The solvent is sparged with nitrogen. The polymer samples are gently stirred at 160° C. for four hours. The injection volume is 200 microliters. The flow rate through the GPC is set at 1 ml/minute.

For Conventional GPC, the IR4 detector is used, and the GPC column set is calibrated by running 21 narrow molecular weight distribution polystyrene standards. The molecular weight (MW) of the standards range from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weight using Equation (1) (as described in Williams and Ward, J. Polym. Sci., Polym. Letters, 6, 621 (1968)):

$$Mpolyethylene = A \times (Mpolystyrene)^B \quad (Eq. 1)$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations:

$$Mw_{cc} = \sum_i \left( \frac{C_i}{\sum_i C_i} \right) M_i = \sum_i w_i M_{cc,i} \quad \text{Eq. 2}$$

$$M_{n,cc} = \sum_i w_i / \sum_i (w_i / M_{cc,i}) \quad \text{Eq. 3}$$

$$M_{z,cc} = \sum_i (w_i M_{cc,i}^2) / \sum_i (w_i M_{cc,i}) \quad \text{Eq. 4}$$

For the LS GPC, the Precision Detector PDI2040 detector Model 2040 is used. Depending on the sample, either the 15° angle or the 90° angle of the light scattering detector is used for calculation purposes. Here, the 15° angle is used.

The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, is obtained from the mass detector area, and the mass detector constant, derived from a suitable linear polyethylene homopolymer, or one of the polyethylene standards of known weight average molecular weight. The calculated molecular weights are obtained using a light scattering constant, derived from one or more of the polyethylene standards mentioned below, and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination. Implicit in the LS area and Conc. area are the respective calibration constants in order to recover molar mass as described in the previous paragraph.

$$M_W = \sum_i w_i M_i = \sum_i \left( \frac{C_i}{\sum_i C_i} \right) M_i = \frac{\sum_i C_i M_i}{\sum_i C_i} = \frac{\sum_i LS_i}{\sum_i C_i} = \frac{LS \text{ Area}}{Conc. \text{ Area}} \quad \text{Eq. 5}$$

For each LS profile, the x-axis (log MWcc-GPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$" where B=1.0. The "log $MW_{PE}$" scale serves as the x-axis for the LS profiles of the experimental section (log $MW_{PE}$ is equated to the log MW(cc-GPC)). The y-axis for each LS profile is the LS detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume using an arbitrary A value (typically around 0.4). The calibration "A" value is iterated when the Mw(CC) from Equation 2 matches Mw(LS) from Equation 5. LS and viscometer detector volume offsets (relative to the IR) are iterated until the slope of LogM(PE-LS) and LogIV(PE-Visc) are congruent with that predicted by Conventional GPC for LogM (Equation 1) and LogIV (using a slope of 0.725 for a Mark-Houwink Transformation of LogM(CC) into Log(IV)) on a broad linear homopolymer polyethylene standard.

Oxygen content of the ethylene-based polymer is determined by mass balance of moles of oxygen fed to the reactor divided by the moles of monomer converted in the reactor (mol ppm).

Differential scanning calorimetry (DSC) is performed on a TA instruments Q200 calorimeter at a ramp rate of 10° C. from 0 to 400° C. under a nitrogen atmosphere with a sample size of 7 to 10 milligrams (mg).

The amyl group content of the ethylene-based polymer is determined by 13C NMR.

Samples for nuclear magnetic resonance (13C NMR) analysis are prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen is removed from the sample by placing the open tubes in a nitrogen environment for at least 45 minutes. The samples are then dissolved, and homogenized, by heating the tube and its contents to 150° C., using a heating block and heat gun. Each dissolved sample is visually inspected to ensure homogeneity. Samples are thoroughly mixed, immediately prior to analysis, and are not allowed to cool before insertion into the heated NMR sample holders.

All data are collected using a Bruker 400 MHz spectrometer. The data is acquired using a six second pulse repetition delay, 90-degree flip angles, and inverse gated decoupling, with a sample temperature of 120° C. All measurements are made on non-spinning samples in locked mode. Samples are allowed to thermally equilibrate for seven minutes prior to data acquisition. The 13C NMR chemical shifts are internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value.

The polymerization of acrylates or vinyl acetates is performed using the following procedure. The sample is prepared inside a glovebox. Into a 40 ml vial with a septum lid is added 12 ml of 2-ethylhexylacrylate (Aldrich, stabilized with monomethyl ether of hydroquinone (MEHQ), no treatment method is used to remove the MEHQ). To this solution is added 50 µmol of C—C initiator. The entire acrylate/initiator solution is removed from the glovebox and placed in a heating block/shaker combination at 40° C. A thermocouple is placed through the septum to record the solution temperature. The block is then slowly heated to 150° C. at 1° C./min and the reaction temperature recorded. The temperature at which an exothermic reaction associated with the acrylate polymerization occurs is then recorded as the polyacrylate takeoff temperature.

Nuclear Magnetic Resonance ($^1$H NMR)

Sample Preparation

The samples are prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The samples are purged by bubbling N2 through the solvent, via a pipette inserted into the tube, for approximately five minutes, to prevent oxidation. Each tube is capped, sealed with TEFLON tape, and then soaked at room temperature, overnight, to facilitate sample dissolution. The samples are kept in a N2 purge box, during storage, before, and after, preparation, to minimize exposure to O2. The samples are heated and vortexed at 115° C. to ensure homogeneity.

Data Acquisition Parameters

The 1H NMR is performed on a Bruker AVANCE 400 MHz spectrometer, equipped with a Bruker Dual DUL high-temperature CryoProbe, and a sample temperature of 120° C. Two experiments are run to obtain spectra, a control spectrum to quantitate the total polymer protons, and a double presaturation experiment, which suppressed the intense polymer backbone peaks, and enabled high sensitivity spectra for quantitation of the end-groups. The control is run with ZG pulse, 4 scans, SWH 10,000 Hz, AQ 1.64 s, D1 14 s. The double presaturation experiment is run with a modified pulse sequence, TD 32768, 100 scans, DS 4, SWH 10,000 Hz, AQ 1.64 s, D1 1 s, D13 13 s.

Data Analysis—1H NMR Calculations

The signal from residual 1H in TCE(tetrachloroethane)-d2 (at 6.0 ppm) is integrated, and set to a value of 100, and the integral from 3 to −0.5 ppm is used as the signal from the whole polymer in the control experiment. For the presaturation experiment, the TCE signal is also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) are obtained.

In the presaturation experiment spectrum, the regions for cis- and trans-vinylene, trisubstituted, vinyl, and vinylidene are integrated. The integral of the whole polymer from the control experiment is divided by two, to obtain a value representing X thousands of carbons (i.e., if the polymer integral=28,000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt strength is measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 s$^{-1}$ at the given die diameter. The extrudate passes through the wheels of the Rheotens located at 100 mm below the die exit and is pulled by the wheels downward at an acceleration rate of 2.4 mm/s$^2$. The force (in cN) exerted on the wheels is recorded as a function of the velocity of the wheels (in mm/s). Melt strength is reported as the plateau force (eN) before the strand broke, and the velocity is measured at the value of melt strength.

For the vinyl decanoate polymerization, the protocol is the same as the protocol for the acrylate polymerization except that vinyl decanoate (from TCI, stabilized with MEHQ, no treatment method is used to remove the MEHQ) is used instead of 2-ethylhexylacrylate.

EXAMPLES

Production of Polyethylene (Small Reactor)

A 100 milliliter (ml) high pressure reactor is filled with ethylene to a pressure of 1500 bar. Ethylene is continuously flowed through the reactor at a rate of 69.78 moles per hour (mol/h). Heptane is also added to the reactor to control the molecular weight. The reactor is heated by an external jacket to 240° C. and initiator 3,4-diethyl-3,4-diphenyl hexane or di-tert-butyl peroxide is added at a flow rate of 0.088 millimoles per hour (mmol/h) to initiate polymerization. In the case of the inventive examples the initiator concentration in this case is 0.013 g initiator per kg ethylene. Polymer is collected from the outlet of the reactor to determine conversion. The polymerization is performed with:
(1) 0.4 mole percent (mol %) of t-butanol and acetone added to the ethylene to mimic peroxide decomposition products in the ethylene recycle stream of a commercial reactor and using di-tert-butyl peroxide as the initiator; (CE 4)
(2) A clean ethylene stream using di-tert-butyl peroxide as the initiator; (CE 3)
(3) A clean ethylene stream using diethyl-diphenyl-hexane as the initiator. (IE 1)

Dissipation factor is measured at 2.47 GHz for these experiments.

Production of Polyethylene (Large Reactor)

A 300 milliliter (ml) high pressure reactor is filled with ethylene to a pressure of 28,000 psi. Ethylene is continuously flowed through the reactor at a rate of 194 moles per hour (mol/h). Either ISOPAR™-E or propylene is fed to the reactor to control the molecular weight or melt index of the final polymer. The reactor is heated by an external jacket to 240° C. and initiator is added at a flow rate of 0.49 millimoles per hour (mmol/h) to initiate polymerization. In the case of the inventive examples the initiator concentration in this case is 0.026 g initiator per kg ethylene. Polymer is collected from the outlet of the reactor to determine conversion. The polymerization is performed with:
(1) A clean ethylene stream using diethyl-diphenyl-hexane as the initiator and Isopar-E as the chain transfer agent. (IE 2)
(2) A clean ethylene stream using diethyl-diphenyl-hexane as the initiator and propylene as the chain transfer agent. (IE 3)
(3) An ethylene stream containing 2000 wt ppm acetone and 2000 wt ppm t-butanol to mimic a recycle ethylene stream, using di-tert butyl peroxide as the initiator and Isopar-E as the chain transfer agent. (CE 5)
(4) An ethylene stream containing 2000 wt ppm acetone and 2000 wt ppm t-butanol to mimic a recycle ethylene stream, using di-tert butyl peroxide as the initiator and propylene as the chain transfer agent. (CE 6)

Dissipation factor is measured at 2.0 GHz for these experiments.

Synthesis of C—C Free Radical Initiators

A representative preparation is shown for 2,7-dimethyl-4,5-diethyl-4,5-diphenyl octane (Structure 5). A similar procedure can be used to produce the other C—C initaiators by substituting the phenone compound used in the alcohol preparation. For example acetophenone or propiophenone can be used to produce structure III and structure IV, respectively.

Representative preparation of tertiary alcohols: Inside a nitrogen-filled glovebox, ethylmagnesium chloride solution (3.0 M in ether, 32.05 mL, 96.2 mmol) is placed in a jar. One hundred (100) ml of sparged & dried THF is then added to the jar followed by 0.6 M LaCl$_3$-2(LiCl) in THF (12.3 mL, 7.40 mmol) dropwise to the magnesium solution (a precipitate may form depending on the choice of magnesium reagent). Once addition is complete, stir for 30 minutes at room temperature (about 23° C.). Add isovalerophenone (12.0 g, 74.0 mmol) dropwise with stirring while cooling the reaction vessel with a fan. After 1 hour, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6.

Representative preparation of diphenyl ethane structures: Inside a nitrogen-filled glovebox, TiCl$_3$ (5.75 g, 37.3 mmol) is added to a jar. To this is added 70 ml of anhydrous 1,2-dimethoxyethane. As a 2.0 M solution in THF, lithium aluminum hydride (6.2 mL, 12.4 mmol) is added slowly over 20 minutes while cooling the reaction vessel with a fan. Heat and gas evolution are noted. After stirring for 20 minutes at room temperature (about 23° C.), 2-methyl-4-phenyl-4-hexanol (2.39 g, 12.4 mmol) is added dropwise. After addition, the mixture is heated to 65° C. After 3 hours, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6. The product has a decomposition temperature of 139° C. as measured by DSC. Other representative decomposition temperatures are 129° C. for 3,4-dibenzyl-3,4-ditolyl hexane (structure VI) and 202° C. for 3,4-diethyl-3,4-diphenyl hexane (Structure IV).

Table 1 reports results from Dow LDPE 722, a sample from WO 2012/177299 A1 (DFDB 1258NT which shows reduced carbonyl ratio and reduced DF), and the inventive example (DEDPH, diethyl-diphenyl-hexane) with 0 carbonyl ratio and even lower dissipation factor. The DTBP (di-tert-butyl peroxide) is a sample made on the same equipment as the DEDPH but using a regular peroxide, DTBP. The last sample is made with DTBP to mimic the typical acetone and butanol levels in a commercial plant recycle stream (DTBP and recycle impurities).

Table 2 reports similar results in a larger reactor showing polymer produced with C—C initiators gives much lower dissipation factor than polymer produced with typical peroxides and typical ethylene impurity levels produced from the breakdown of those peroxides.

TABLE 1

Carbonyl Ratios and Dissipation Factor (DF) Values of Selected Inventive and Comparative Ethylene-Based Polymers Produced in the Small Reactor

| Name | Type | Carbonyl Ratio | DF (radian) at 2.47 GHz |
|---|---|---|---|
| Dow LDPE 722 | CE 1 | 0.1 | $2.14 \times 10^{-4}$ |
| DFDB 1258NT | CE 2 | 0.04 | $1.51 \times 10^{-4}$ |
| DEDPH | IE 1 | 0 | $1.49 \times 10^{-4}$ |
| DTBP | CE 3 | 0.39 | $1.60 \times 10^{-4}$ |
| DTBP and recycle impurities | CE 4 | >0.4 | $3.72 \times 10^{-4}$ |

TABLE 2

Dissipation Factor (DF) Values of Selected Inventive and Comparative Ethylene-Based Polymers Produced in the Large Reactor

| | Initiator | Chain Transfer Agent | Ethylene Impurities | DF (radian) at 2.0 GHz |
|---|---|---|---|---|
| IE2 | DEDPH | Isopar-E | none | $5.14 \times 10^{-5}$ |
| IE3 | DEDPH | Propylene | none | $5.54 \times 10^{-5}$ |
| CE5 | DTBP | Isopar-E | acetone/butanol | $1.31 \times 10^{-4}$ |
| CE6 | DTBP | Propylene | acetone/butanol | $1.38 \times 10^{-4}$ |

TABLE 3

Melt Index, Density and Melt Strength of Selected Inventive and Comparative Ethylene-Based Polymers Produced in the Large Reactor

| Sample | MI (g/10 min) | Density (g/cc) | Melt Strength Velocity (mm/s) | Melt Strength (cN) |
|---|---|---|---|---|
| IE2 | 4.41 | 0.9212 | 251 | 6.0 |
| IE3 | 2.60 | 0.9200 | 318 | 7.4 |
| CE5 | 4.09 | 0.9219 | 276 | 8.9 |
| CE6 | 1.88 | 0.9214 | 141 | 11.9 |

TABLE 4

TDGPC of Selected Inventive and Comparative Ethylene-Based Polymers Produced in the Large Reactor

| Sample | Mn, Conv. (g/mol) | Mw, Conv (g/mol) | Mz, Conv. (g/mol) | Mw/Mn, Conv. | Mw, Abs (g/mol) | Mz, Abs (g/mol) | Mz/Mw, Abs |
|---|---|---|---|---|---|---|---|
| IE2 | 17,486 | 114,537 | 588,803 | 6.55 | 373,183 | 5,802,190 | 15.55 |
| IE3 | 18,323 | 102,441 | 551,320 | 5.59 | 297,176 | 5,461,427 | 18.38 |
| CE5 | 16,899 | 122,687 | 672,628 | 7.26 | 439,100 | 5,928,991 | 13.50 |
| CE6 | 18,781 | 139,086 | 788,085 | 7.41 | 550,320 | 6,633,344 | 12.05 |

TABLE 5

$^1$H NMR of Selected Inventive and Comparative Ethylene-Based Polymers Produced in the Large Reactor

| Sample | Vinyl/ 1000 C. | Cis and Trans/ 1000 C. | Trisub/ 1000 C. | Vinylidene/ 1000 C. | Total Unsat/ 1000 C. |
|---|---|---|---|---|---|
| IE2 | 0.031 | 0.02 | 0.044 | 0.13 | 0.22 |
| IE3 | 0.275 | 0.042 | 0.049 | 0.105 | 0.47 |
| CE5 | 0.032 | 0.02 | 0.048 | 0.122 | 0.22 |
| CE6 | 0.118 | 0.027 | 0.04 | 0.105 | 0.29 |

What is claimed is:

1. A process for making an ethylene-based polymer, the process comprising the step of contacting at polymerization conditions ethylene and, optionally, one or more alpha-olefin comonomers, with at least one carbon-carbon (C—C) hydrocarbyl, free-radical initiator of any of Structures IV-VIII:

3,4-diethyl-3,4-diphenyl hexane (Structure IV)

2,7-dimethyl-4,5diethyl-4,5-diphenyl octane (DBuDPH) (Structure V)

3,4-dibenzyl-3,4-ditolyl hexane (DBnDTH) (Structure VI)

Structure VI 3,4-diethyl-3,4-di(dimethylphenyl) hexane (Structure VII)

Structure VII and, 3,4-dibenzyl-3,4-diphenyl hexane (Structure VIII)

Structure VIII and the polymerization conditions include a polymerization temperature of 210° C-300°C.

2. The process of claim 1 in which the C—C hydrocarbyl, free-radical initiator is present in an amount greater than, or equal to, 0.001 grams per kilogram (g/kg) of the ethylene fed to the polymerization reaction.

3. The process of claim 1 in which the C—C hydrocarbyl, free-radical initiator has a decomposition temperature of greater than or equal to (≥) 125° C. based on a DSC measurement.

4. The process of claim 1 in which two or more C—C hydrocarbyl, free-radical initiators are contacted with ethylene and, optionally, one or more alpha-olefin comonomers.

5. A process for making an ethylene-based polymer, the process comprising the step of contacting ethylene and, optionally, one or more comonomers, with at least one carbon-carbon (C—C) hydrocarbyl, free-radical initiator with a DSC decomposition temperature less than, or equal to, 145° C. and of Structure I:

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the proviso that at least one of $R_2$ and $R_5$, and at least one of $R_3$ and $R_6$ is an alkaryl group of at least seven carbon atoms.

6. The process of claim 5 in which a comonomer is present and the comonomer is at least one of an alpha-olefin, an acrylate or a methacrylate.

7. The process of claim 6 in which the initiator is selected from the group consisting of 3,4-dibenzyl-3,4-ditolyl hexane (Structure VI)

Structure VI and, 3,4-dibenzyl-3,4-diphenyl hexane (Structure VIII)

Structure VIII

8. The process of claim 6 in which the ethylene and, optionally, one or more comonomers, are contacted with at least one carbon-carbon (C—C) hydrocarbyl, free-radical initiator in the absence of a peroxide or other form of oxygen.

9. The process of claim 6 in which the ethylene and, optionally, one or more comonomers, are contacted with at least one carbon-carbon (C—C) hydrocarbyl, free-radical initiator in the presence of a peroxide or other form of oxygen.

10. The process of claim 6 in which the acrylate is 2-methylhexyl acrylate.

11. An ethylene-based polymer made by the process of claim 5.

12. The ethylene-based polymer of claim 11 made in the absence of oxygen and having the following properties: (1) a carbonyl ratio of less than (<) 0.02, and (2) a dissipation factor less than or equal to (≤) $1.49 \times 10^{-4}$ radian at 2.47 GHz, and (3) an oxygen content of less than 50 parts per million (ppm) by weight.

13. The ethylene-based polymer of claim 12 in which the polymer is a low density polyethylene (LDPE).

14. The ethylene-based polymer of claim 12 in which the carbonyl ratio is less than (<) 0.01.

* * * * *